United States Patent
Berson et al.

(10) Patent No.: US 6,904,525 B1
(45) Date of Patent: Jun. 7, 2005

(54) METHOD FOR PREVENTING COUNTERFEITING OF ARTICLES OF MANUFACTURE

(75) Inventors: William Berson, Weston, CT (US); Claude Zeller, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 672 days.

(21) Appl. No.: 08/886,516

(22) Filed: Jul. 1, 1997

(51) Int. Cl.$^7$ .............................................. H04L 9/00
(52) U.S. Cl. ...................... 713/179; 713/176; 705/59
(58) Field of Search ................ 380/30, 51; 283/81, 283/74, 83; 713/176, 187, 185, 200; 705/59

(56) References Cited

U.S. PATENT DOCUMENTS

| | | | | |
|---|---|---|---|---|
| 3,701,165 A | * | 10/1972 | Huddleston | 2/243 |
| 4,924,078 A | * | 5/1990 | Sant'Anselmo | 235/494 |
| 4,949,381 A | * | 8/1990 | Pastor | 380/51 |
| 5,222,134 A | * | 6/1993 | Waite et al. | 705/59 |
| 5,243,655 A | * | 9/1993 | Wang | 380/51 |
| 5,365,586 A | * | 11/1994 | Indeck et al. | 713/176 |
| 5,388,158 A | | 2/1995 | Berson | |
| 5,490,216 A | * | 2/1996 | Richardson, III | 705/59 |
| 5,546,462 A | | 8/1996 | Indeck et al. | 380/23 |
| 5,592,561 A | * | 1/1997 | Moore | 382/103 |
| 5,607,187 A | * | 3/1997 | Salive | 283/67 |
| 5,638,446 A | * | 6/1997 | Rubin | 705/51 |
| 5,675,650 A | * | 10/1997 | Cordery | 380/23 |
| 5,768,384 A | * | 6/1998 | Berson | 380/23 |
| 5,835,689 A | * | 11/1998 | Braun et al. | 395/113 |
| 5,940,504 A | * | 8/1999 | Griswold | 705/59 |
| 6,023,763 A | * | 2/2000 | Grumstrup et al. | 713/200 |

* cited by examiner

*Primary Examiner*—Matthew Smithers
(74) *Attorney, Agent, or Firm*—Ronald Reichman; Angelo N. Chaclas

(57) ABSTRACT

A method for verifying the source of an article of manufacture. A label having information relating to the article is prepared and digitally signed or otherwise encrypted to authenticate the information. The label and a tangible representation of the digital signature or other encrypted information are then securely associated with the article. The information relating to the article can include verifying information such as an expiration date, unique identification of the article, identification of an authorized provider of the article or a description of the article to protect against unauthorized use of duplicate labels. The label can also include an unreproduceable pattern such as a pattern of magnetic fibers embedded in the label and a digitally signed description of the pattern.

6 Claims, 1 Drawing Sheet

METHOD FOR PREVENTING COUNTERFEITING OF ARTICLES OF MANUFACTURE

FIELD OF THE INVENTION

The subject invention relates to labeling of articles. More particularly, it relates to a method for labeling articles of manufacture to identify their source and prevent counterfeiting.

Counterfeiting and forgery of goods are well known problems. Manufacturers of luxury goods such as watches, luggage, perfume, etc. must constantly deal with counterfeiters who produce cheap imitations. And even inexpensive goods such as T-shirts can acquire considerable cachet, and associated high markup, by being marked with the image of a famous cartoon character, or other valuable, proprietary logo.

While the counterfeiting of consumer goods or other articles of manufacture thus represents a problem which is probably comparable to problems associated with the counterfeiting of documents which represent value (e.g., currency), until recently no comparable efforts have been made to combat this problem. While there is a long history of techniques such as elaborate engraving and use of special paper stocks to prevent counterfeiting of currency, in general similar efforts have not been used even for the most expensive luxury goods.

Another approach which has been used to combat counterfeiting of documents is the use of encryption U.S. Pat. No. 4,853,961, issued to: Pastor on Dec. 18, 1987 describes one method for encrypting information extracted from a document and imprinting the document with the encrypted information in order to verify the information contained in the document. Similarly, U.S. Pat. No. 5,388,158, issued on Feb. 7, 1995 to William Berson teaches a method wherein a document is scanned to produce a digital signal which is compressed, encrypted, and coded as a two dimensional bar code, which is incorporated into a label which is affixed to the document.

While these and other similar methods have been useful for their intended purpose, that purpose has been limited to the verification of the information content of a document. In general, those who use such techniques either are not concerned that the information be duplicated so long as it is not altered, or, as with currency, are willing to rely on other techniques to detect duplication. Since much of the value of the sort of articles of manufacture which are likely to be counterfeited inheres in the fact that each particular item is essentially indistinguishable from other items of the same type, there has been, to applicant's best knowledge, no previous attempt to use encryption techniques to verify the source of articles of manufacture.

Another related use of encryption relates to the identification of individuals. Commonly assigned, co-pending U.S. patent application Ser. No. 979,018; by Marcus filed on Nov. 20, 1992 describes an identification card which includes an encrypted representation of a biometric characteristic of an individual to be identified (e.g., a fingerprint or facial image). This encrypted representation is decrypted and compared to the individual. Again, since articles of manufacture which are likely to be counterfeited in general do not have distinguishing characteristics, applicant believes that there has been no effort to apply such techniques to the problem of verifying the source of an article of manufacture. (Even if an article includes a unique marking such as a serial number, in general there is no convenient way to determine if the serial number is original or a duplication.)

Thus, it is an object of the subject invention to provide a method whereby encryption techniques may be used to verify the source of articles of manufacture.

BRIEF SUMMARY OF THE INVENTION

The above object is achieved, and the disadvantages of the prior art are overcome in accordance with the subject invention by means of a method which includes the steps of preparing a label which includes information relating to an article of manufacture and encrypting at least a portion of the information. The article, the label, and a tangible representation of the encrypted information are then securely associated.

As used herein, the term "label" includes not only conventional labels which are glued or otherwise affixed to an article but also includes the marking which is associated with the article and which is sufficiently likely to remain associated with the article through the period of interest. For example, the label for an expensive watch or piece of jewelry may be engraved on the article itself, while the label for a relatively inexpensive appliance may be printed on the shipping carton.

Also, as used herein "securely associating" means that the article, label, and the tangible representation of the encrypted information are associated in a manner such that the likely expense and difficulty of trying to separate and reuse the label and tangible representation will exceed any benefit which can be obtained thereby.

In accordance with one aspect of the subject invention, the information included on the label includes verifying information, such as expiration date, a particularly identification of the article such as a serial number, an identification of an authorized provider of the article, or a description of the article, while protecting against unauthorized use of duplicate labels.

In accordance with another aspect of the subject invention, the label includes an unreproduceable pattern and the method includes the further step of including an encrypted description of the unreproduceable pattern with the encrypted information.

In accordance with another aspect of the subject invention, the encrypted information is encrypted with a private key of a public/private key pair and the corresponding public key is available to parties who wish to validate the source of the article.

Those skilled in the art will recognize that the above object is achieved, and that the disadvantages of prior art are overcome by the subject invention. Other objects and advantages of the subject invention will be apparent to those skilled in the art from consideration of the attached drawings and the detailed description set forth below.

DETAILED DESCRIPTION OF PREFERRED EMBODIMENTS OF THE INVENTION

Figure 1:
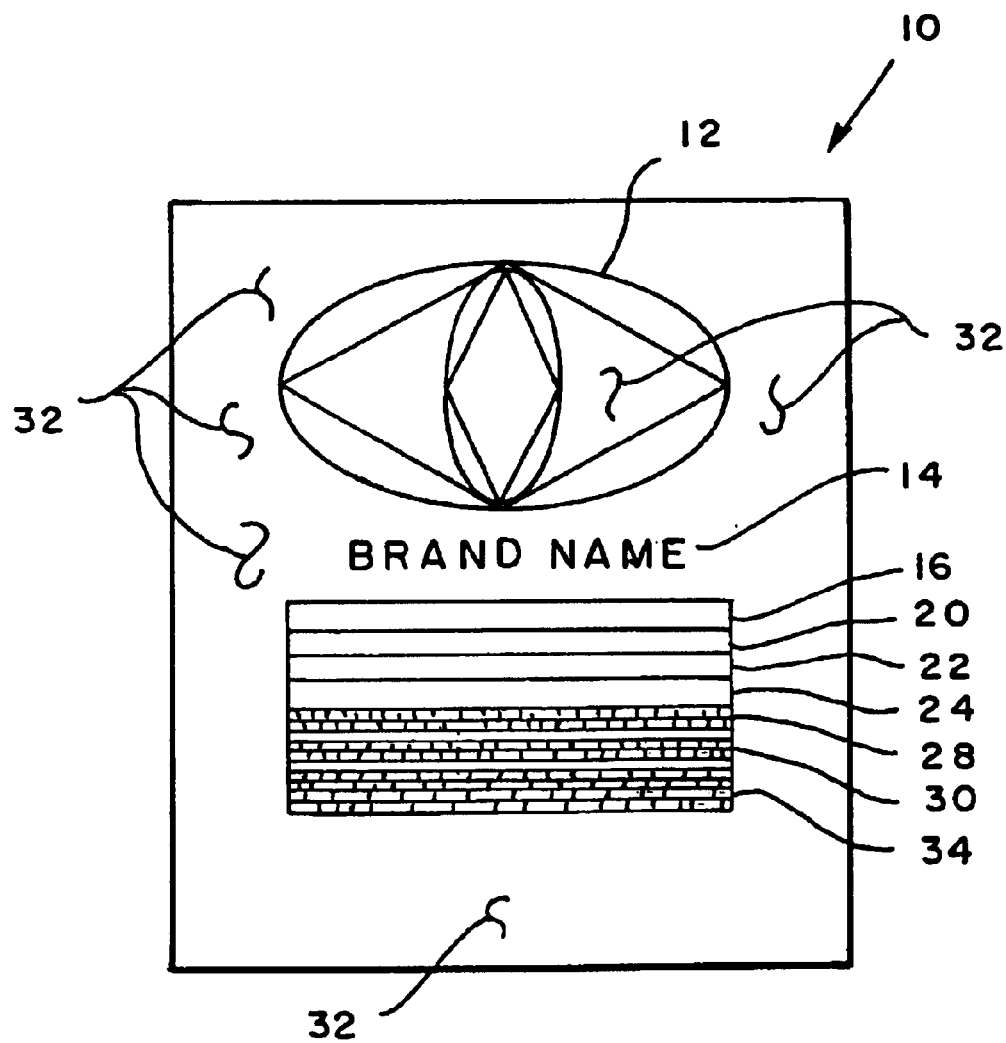
FIG. 1 is a semi-schematic plan view of a label used in practicing the method of the subject invention.

FIG. 1 shows label 10 which can be used in accordance with the subject invention to verify the source of an article of manufacture. Label 10 can include conventional logo 12 and/or brand name 14, as well as any other information which might normally be found on a product label.

Additionally, in one embodiment of the subject invention, verifying information is included in field 16, 20, 22, and 24. These fields might contain, for example, a serial number uniquely identifying a particular article, a description of such article in terms of size, color, model, etc., the identity of an authorized provider or reseller of such an article, or an expiration date beyond which a sale would not be authorized. As will be described further below, such verifying information provides a degree of protection against the unauthorized use of duplicate labels since a particular label will have only limited usefulness in terms of the time, place, or articles with which it may be used. (Though it has been noted above that serial numbers have had limited usefulness in preventing counterfeiting of articles of manufacture, a serial number can be useful where articles are sold in large lots since a counterfeiter would need to copy labels for each item in a lot.)

All, or selected portions, of the information on label 10 is then replicated in a scannable form in field 28. Preferably, the information is replicated in the form of a two dimensional bar code such as is specified in the well known PDF 417 standard. All, or selected parts, of the information on label 10 is then digitally signed in a conventional manner in field 30.

In accordance with the subject invention, a manufacturer or authorized provider of an article of manufacture prepares a label such as shown in FIG. 1 using an encryption key which the manufacturer or other authorized provider keeps in secret. Label 10 is then securely associated with the article; typically by affixing it to the article so that it cannot be removed without destroying it.

It should be noted that other methods of securely associating label 10 with the article, such as printing it on a container for the article, are also within any contemplation of the subject invention. Further, label 10 need not comprise a single element. For example, the information in field 28 and/or the digital signature in field 30 may be printed on an invoice or manifest which accompanies the article. As noted above, secure association of label 10 with an article of manufacture requires only that it be made sufficiently difficult or expensive in some manner so that it is likely that the cost of unauthorized re-use of label 10 will exceed any benefit.

While the use of verifying information as described above limits the ability of a counterfeiter to use duplicate labels, some articles of particularly great value may require more nearly total protection. This is achieved in accordance with one embodiment of the subject invention by incorporation of an unreproduceable pattern in or on label 10. Such a pattern is shown as elements 32 in FIG. 1. Preferably elements 32 are magnetic fibers as are described in U.S. Pat. No. 5,003,291; to: Strom-Olsen; issued: Mar. 26, 1991 which is hereby incorporated by reference, which is incorporated in the stock on which label 10 is printed when the stock is manufactured. Since the fibers are randomly distributed through the stock as it is formed, the distribution pattern of such fibers in a particular label cannot be reproduced without extraordinary effort. When the label is produced, unreproduceable pattern 32 is scanned and a tangible representation, which is preferably a barcode representation, is incorporated in field 34 and digitally signed together with the information in field 28. A very high degree of confidence of the authenticity of label 10 may then be achieved by scanning patterns 32 and comparing it to the description in field 34. Verification of the description in field 34 will then verify the authenticity of label 10.

Methods for detecting the presence of magnetic fibers are known and are described in the above-referenced U.S. Pat. No. 5,003,291 and a sufficiently precise description may be generated by scanning label 10 with a detector having a sufficiently small aperture.

Other methods of producing an unreproduceable pattern are known; one of the simplest being simply to spatter a sheet of paper stock with drops of ink or paint. Any such method which can be described and scanned with sufficient precision is within contemplation of the subject invention; where the degree of precision needed is determined by the desired degree of protection, since clearly the more precisely the unreproduceable pattern is described, the more difficult it will be to approximate.

In another preferred embodiment of the subject invention, the information on label 10 is digitally signed using the private key of a public/private key pair. (Public/private key encryption is a known encryption technique where one key of a key pair is used to encrypt data and the other to decrypt the data and the private key cannot be determined from knowledge of the data and the public key.) Thus, the public key may be made widely available while the private key is kept in secret so that articles of manufacture may be readily verified in accordance with the subject invention but can only be so labeled by a manufacturer or authorized provider having knowledge of the private key.

One disadvantage of such a system is that where a large a number of parties are providing articles to a single party for verification. The verifying party is then faced with the problem of maintaining a database of public keys for each of the providing parties. This problem can be overcome in accordance with another embodiment of the subject invention by means of a "nested key" system, wherein a trusted third party delivers distinct private, encryption keys to each of the providing parties together with a corresponding decryption key which has been encrypted with the third party's private, encryption key. The providing parties then digitally sign label 10 as described above and incorporate the encrypted decryption key on label 10. Any party wishing to verify label 10 need only have knowledge of the trusted third partys public, decryption key to recover the decryption key needed to verify digitally signed label 10.

The method of the subject invention may also be used to control the production of articles by licensees of trademarks or other intellectual property. The trademark licenser may control the supply of labels to the trademark licensee to control or monitor the number of articles produced. Alternatively, the licensee may label the articles as described above while the licenser controls the process of digitally signing the labels.

It should also be noted that stock having an unreproduceable pattern in combination with an encrypted or digitally signed description of that pattern can be used to produce valuable documents such as currency, or security tapes used to provide evidence of tampering.

Digital signing is a well known technique for showing that information has not been changed, wherein a portion of the information selected by a "hash function" is encrypted to provide a "digital signature". By again applying the "hash function" to the information and comparing the result to the decrypted signature the information may be verified. However, other protocols wherein all or part of the particular information is encrypted in order to assure its authenticity are known and such techniques are within the contemplation of the sub-convention.

The embodiments described above have been provided by way of illustration only and other embodiments of the sub-convention will be apparent to those skilled in the art from consideration of the above detailed description and the attached drawings. Accordingly, limitations on the subject invention are to be found only in the claims set forth below.

What is claimed is:

1. A method for verifying the source of an article of manufacture, and for controlling the production of the article of manufacture by a licensee, the method comprising the steps of:
   a) controlling a supply of labels from a licensor to the licensee to monitor the production of the article of manufacture;
   b) preparing a label by the licensee, the label having an unreproduceable pattern and information relating to the article;
   c) processing the unreproduceable pattern and including the processed unreproduceable pattern with the information relating to the article;
   d) encrypting at least a portion of the information by the licensor relating to the article; and
   e) securely associating the article, the label, and a tangible representation of the encrypted information.

2. A method described in claim 1 wherein said information included on said label includes verifying information for protecting against unauthorized use of duplicate labels.

3. A method as described in claim 2 wherein said verifying information includes information consisting of: an expiration date, a unique identification of said article of manufacture, an identification of a provider of said article of manufacture, or information describing said article of manufacture.

4. A method as described in claim 1 wherein said unreproduceable pattern is formed from magnetic fibers embedded in said label.

5. A method as described in claim 1 wherein said encrypted information is encrypted with a first private key of a first public/private key pair and a corresponding first public key is available to parties who wish to validate the source of said article.

6. A method as described in claim 5 wherein a trusted third party provides a party producing said label with said first private key and with an encryption of said first public key by a second private key kept secret by said trusted third party, said producing party including said encryption of said first public key with said label and said trusted third party providing a corresponding second public key to parties who wish to verify the source of said article; whereby said parties can recover said first public key from said label so that articles from a large number of different sources can be verified without the need to maintain a corresponding database of public keys.

* * * * *